United States Patent Office 3,084,590
Patented Apr. 9, 1963

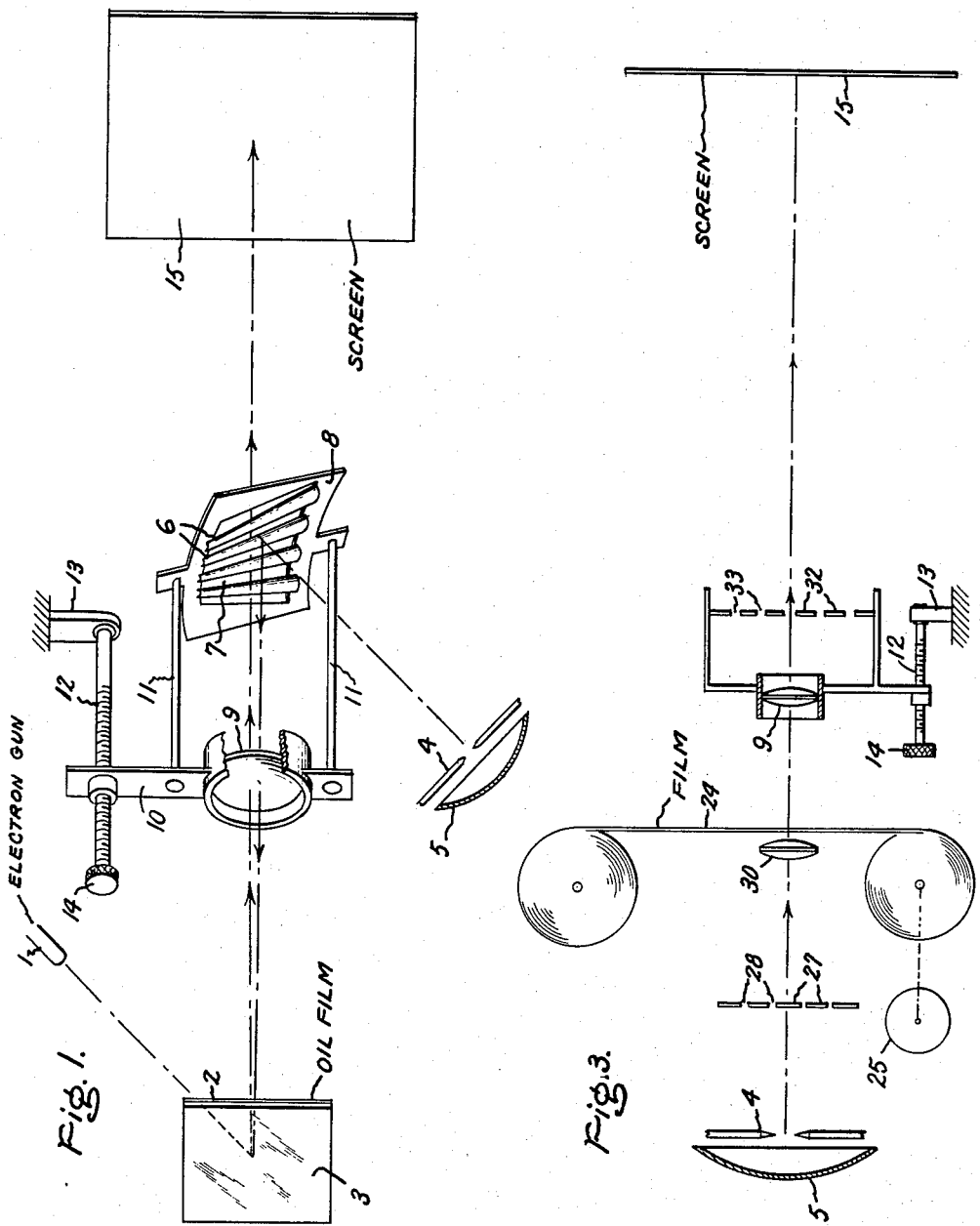

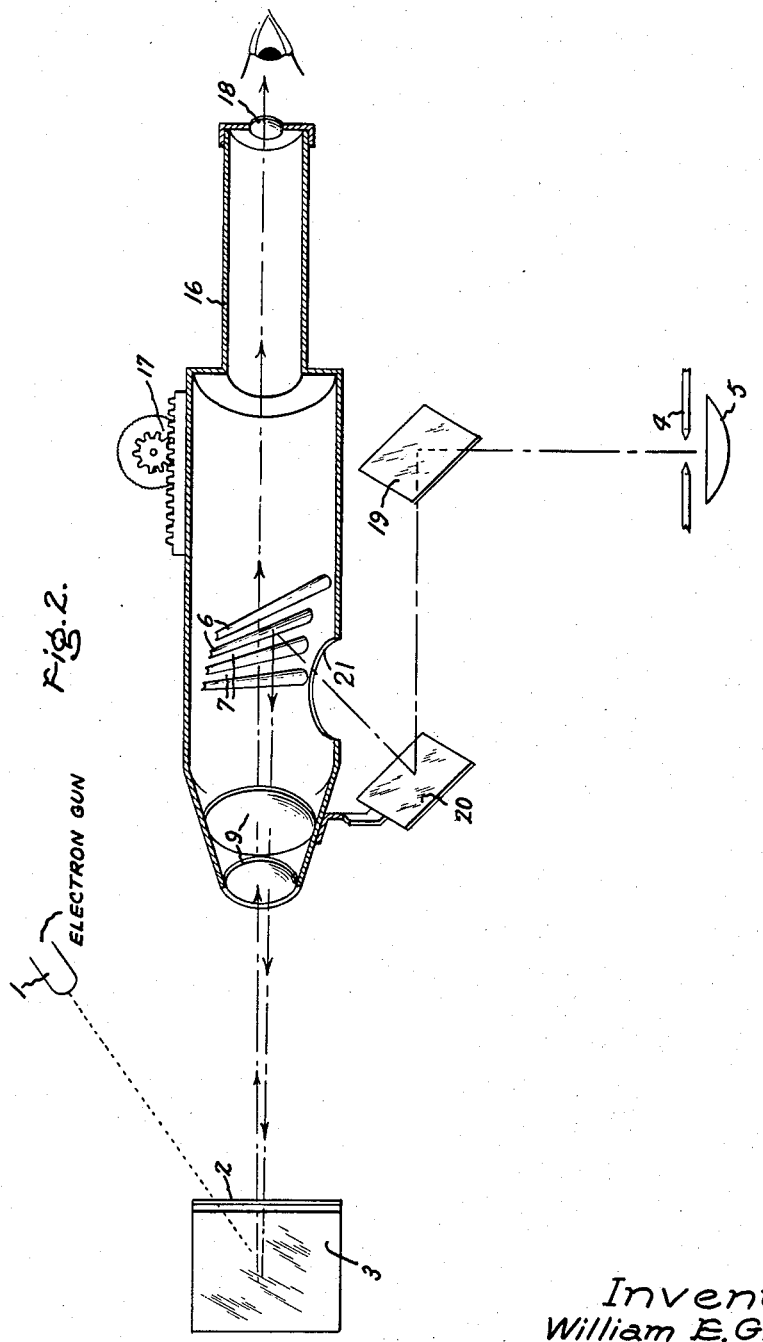

3,084,590
OPTICAL SYSTEM
William E. Glenn, Jr., Scotia, N.Y., assignor to General Electric Company, a corporation of New York
Filed Feb. 26, 1959, Ser. No. 795,694
16 Claims. (Cl. 88—1)

The present invention relates to an optical system for projecting light to produce an image corresponding to diffraction gratings in a light modulating medium.

My present invention is an optical system that is especially suited for use with the type of projection system in which the projected light is diffracted by diffraction gratings in a light modulating medium. One such projection system is described and claimed in my Patent Re. 25,169 which is assigned to the assignee of the present invention. In this system, an electron beam, modulated with applied color television signals, is deflected over the surface of a deformable light modulating medium. As it deflects over the surface, the beam produces a charge pattern on the surface as a function of the applied signals. The electrons in the charge pattern, which are attracted to a conducting plane beneath the modulating medium, deform the surface into depressions that have the dimensions of grating lines. In effect, three diffraction gratings are formed corresponding, respectively, to the red, blue and green primary color content of the televised scene.

For the projection of pictures, this light modulating medium must be placed in a suitable optical system. In the optical system described in the above-mentioned patent, a plurality of light sources are produced by a single light source and a masking system. Light from the source in shining through a plurality of transparent areas in the masking system produces the effect of a plurality of light sources. When there are no diffraction gratings in the modulating medium, this light is focused onto opaque regions of a second masking system, and thus is completely masked. But if there are diffraction gratings, they diffract the corresponding colors through a plurality of transparent areas in the second masking system. This transmitted light is then focused on a projection screen where it produces a color image corresponding point-by-point with the diffraction gratings and thus with the televised image.

This optical system is referred to as a transmission type optical system since light is transmited through the light modulating medium as contrasted to being reflected from it.

The projection lens system should be placed as close as possible to the light modulating medium since the closer this distance the larger the image on the projection screen, i.e., the greater the magnification. However, in prior optical systems this projection lens system is preferably not placed close to the light modulating medium between the second light mask and the light modulating medium—because then it has an adverse effect upon the focusing of light on the second masking system. Thus, the magnification is limited.

Accordingly, an object of the present invention is to provide an improved transmission type optical system for a diffraction grating type projection system.

Another object of the present invention is to provide for a diffraction grating type projection system an improved optical system which produces a maximum amount of magnification of the projected image.

In another type of optical system, which will be referred to as a reflection type optical system, light is reflected from the light modulating medium. A plurality of light sources are provided by a single light source and a plurality of spaced reflecting bars that are positioned to reflect light from this source on the light modulating medium. When there are no diffraction gratings in the light modulating medium, a conducting mirror beneath the light modulating medium focuses the incident light on the medium back onto the reflecting bars which thus masks this light. If there are diffraction gratings they diffract colored light through slits between the reflecting bars as a function of the parameters of the diffraction gratings. The light transmitted through the slits is then focused on a projection screen where it produces a color image corresponding point-by-point with the parameters of the diffraction gratings.

In this optical system, as in the transmission type optical system, the projection lens should be placed near the light modulating medium. But in the prior systems it is not placed between the reflecting bars and the light modulating medium since then it would interfere with the focusing action of the mirror. Also, in the prior systems a projection lens is required as well as the focusing mirror. It would be advantageous to have a single lens system for providing both focusing functions.

Hence, an object of the present invention is to provide for a diffraction grating type projection system an improved reflection type optical system which produces a maximum amount of magnification of the projected image.

A further object of the present invention is to provide for a diffraction grating type projection system an improved reflection type optical system in which a single lens system performs several focusing functions.

These and other objects are achieved in a preferred reflection type embodiment of my invention in which a single lens system is mounted with respect to the reflecting bars so that the bars are on the focal surface of the lens system. With this arrangement this lens system focuses the non-diffracted light on these bars. Also, the lens system and bars are made movable with respect to the light modulating medium so that this same lens can be positioned to focus the diffracted light on the projection screen.

The novel features believed characteristic of the invention are set forth in the appended claims. The invention itself, together with further objects and advantages thereof, may best be understood by reference to the following description, taken in connection with the accompanying drawings, in which:

FIG. 1 is a schematic illustration of a reflection type optical system embodiment of my invention, FIG. 2 is a sectional illustration of a reflection type optical system embodiment utilized in a microscope, and FIG. 3 is a schematic illustration of a transmission type optical system embodiment of my invention.

Referring now to FIG. 1, an electron gun assembly 1 forms an electron charge pattern on a modulating medium 2, which may be a conventional light modulating medium oil film. This charge pattern is formed as a function of signals supplied to the electron gun assembly 1. The details of the electron gun assembly have not been illustrated since they are not pertinent to this invention and also because suitable electron gun assemblies are known to those skilled in the art. For example, the one illustrated in my Patent Re. 25,169 may be used. The electron charge on the surface of medium 2, which is electrostatically attracted to a flat conducting mirror 3 beneath medium 2, forms depressions in medium 2 corresponding to grating lines of one or more phase diffraction gratings. For the projection of monochrome images, there will be only one phase diffraction grating, but for the projection of color images there may be several diffraction gratings.

This modulating medium 2 is placed in a preferred optical system embodiment of my invention that projects light as a function of the diffraction gratings in medium 2. The light for this optical system originates from arc electrodes 4 that produce an intense light. This light is cast by a curved mirror 5 over a masking system that includes a plurality of reflecting members 6 separated by transparent areas or slits 7 and that are mounted in a frame 8. The details of this masking system will not be explained here since curved bar masking systems are fully explained and claimed in my copending application S.N. 782,956, filed December 24, 1958, now Patent 3,044,358, which is assigned to the assignee of the invention. Although a curved bar system is preferred, the advantages of the present invention are also obtainable with other types of masking systems.

From the above it is seen that the arc electrodes 4 in conjunction with members 6 may be considered as a source of a plurality of beams of light.

The masking system is positioned at an angle with the direction of the beam from arc electrodes 4 so that the light reflected from members 6 is directed along the axis of the optical system. This light is transmitted through a lens 9 mounted in a frame 10 and positioned the focal length of lens 9 away from the center point of members 6 by rods 11 extending between frames 8 and 10. To be more specific, the masking system is positioned as closely as possible to the focal surface of lens 9. By focal surface is meant that surface from which light will be focused at infinity by lens 9. In other words the light reflected from any point of the masking system is focused into parallel rays by lens 9. In some lenses this focal surface is a plane passing through the focal point of the lens at right angles to the lens axis. Then this surface is called a focal plane. However, for almost all non-corrected lenses this surface is curved. Thus, a lens 9 can be selected such that the masking system lies close to the focal surface thereof. Unfortunately, due to its tilt, the masking system cannot lie exactly on the focal surface of the more conventional type lenses.

Lens 9 and the masking system are movable with respect to the modulating medium 2 by means illustrated as a bolt 12 mounted in fixed position at one end in a socket 13 and rotatable by a knob 14 in threads in frame 10. Thus, lens 9 and the masking system always move as a unit such that the masking system is at all times on or very close to the focal surface of lens 9.

The light rays, after passing through lens 9, are incident upon medium 2. They are then reflected by flat mirror 3 back onto the lens system 9. Since these rays would image at infinity if not acted upon by a lens system, lens system 9 focuses them on its focal surface. It is a well known optical fact that light rays directed to image at infinity will be focused by a lens on its focal surface. Consequently, when there are no diffraction gratings in medium 2 to divert the light rays, lens 9 images these rays back onto reflecting members 6. Then no light is transmitted through transparent areas 7, and no light is incident on an image receiving surface illustrated as a projection screen 15. If there are diffraction gratings in medium 2 they will, in a monochrome projection system, diffract white light through areas 7 as a function of the parameters of the diffraction gratings. And in a color projection system, they will cause certain colored light to be transmitted by transparent areas 7. The transmitted light is focused on screen 15.

In a monochrome projection system the members 6 and the areas 7 are of such widths and are positioned such that substantially all the diffracted colors are transmitted by areas 7 in the same proportion—the amount of light being so transmitted being a function of the amplitude of the diffraction grating in medium 2. Thus, in this system, black and white images are produced upon screen 15. In the color projection system application the widths of areas 7 are considerably narrower than for a monochrome system. They are made sufficiently narrow such that the diffraction gratings in medium 2 diffract first order diffracted light through areas 7 of substantially only the light of the colors corresponding to these gratings. The intensity of this diffracted light is also a function of the amplitude of the respective diffraction gratings. The grating spacings determine the colors transmitted by areas 7.

In the prior type reflection type optical systems, mirror 3 is curved to focus the light reflected from the masking system back onto the masking system. Consequently, a projection lens cannot be placed between the masking system and medium 2 since it would interfere with this focusing action. However, in the present invention, mirror 3 may be flat and thus does not form a focusing action. Rather the light is focused on the masking system by lens 9, as previously explained. As is explained in the following paragraph the same lens 9 can also focus the diffracted light on the projection screen 15.

For the focusing of light on the projection screen 15, knob 14 is rotated until an image appears in sharp focus on screen 15. Then the position of lens 9 with respect to medium 2 and screen 15 will agree with the following well known optical equation:

$$\frac{1}{f} = \frac{1}{p} + \frac{1}{q}$$

wherein $f$ is the focal length of lens 9, $p$ is the distance between lens 9 and medium 2—the object distance—and $q$ is the distance between lens 9 and screen 15—the image distance. The movement of lens 9 does not affect its focusing action as regards focusing light on the masking system since the masking system fixedly mounted to lens 9 on the focal surface thereof. Thus, lens 9 performs the dual functions of focusing light on the masking system and focusing light on the projection screen 15.

One of the advantages of the system of FIG. 1, as compared to the prior art systems, is that mirror 3 does not have to be curved. A much less expensive flat mirror can be used. Also, greater magnification can be obtained because the projection lens 9 can be placed very close to the medium 2. And of course, the closer this distance the greater the magnification of the image on screen 15.

In those applications in which a projection type optical system cannot be used, a microscope may be employed. In these applications the picture element or other type information formed by the diffraction gratings is too small to be projected large enough to be seen by the naked eye. As an illustration of the possible minuteness of the picture elements: the grating spacings of these diffraction gratings may be the order of 1 micron. Due to these small spacings and since for monochrome light only one diffraction grating is required while for polychrome applications only three or four are needed, the picture elements may be very small. As mentioned, in such applications it is desirable to use a microscope to read out the information that is in the form of the diffraction gratings. In FIG. 2 there is illustrated the embodiment of FIG. 1 as applied to a microscope.

The microscope housing may be conventional comprising a tube 16 that is axially movable by a rack and gear mechanism 17. The masking system is fixedly mounted in tube 16 as close as possible to the focal surface of objective lens 9, illustrated as a compound lens. Light from electrodes 4 is reflected by two mirrors 19 and 20 through an aperture 21 in tube 16 onto the masking system. Mirror 19 is fixed with respect to electrodes 4 and mirror 20 is fixedly mounted to tube 16 so that irrespective of the axial position of tube 16, light from arc electrodes 4 is transmitted through aperture 21. A similar mirror arrangement could be utilized with the embodiment of FIG. 1, if desired. The objective lens 9 of the microscope is utilized as the lens for imaging the light onto the masking system. This result is obtained since the masking system is in the focal surface of objective lens 9.

The operation of this microscope system is substantially identical to that previously explained for the embodiment of FIG. 1. The light from electrodes 4 is reflected by members 6 onto modulating medium 2. This light is then reflected by mirror 3 and is focused by the objective lens 9 onto member 6 when there are no diffraction gratings in medium 2. If there are diffraction gratings, they diffract light through the transparent areas 7. This diffracted light is imaged by objective lens 9 into a real enlarged image at a position in the tube 16. Then the tube 16 is moved until the eyepiece 18 forms an enlarged virtual image of this image.

It is thus seen that the embodiment of FIG. 1 is particularly adaptable to a microscope application. And it involves no alteration of the microscope other than the insertion of the reflecting members 6 and an aperture 21 for the transmission of light from the light source. Also it does not affect the magnifying properties of the microscope.

Sometimes it is desired to utilize a transmission type optical system rather than a reflection type. In a transmission type optical system, light is projected through the light modulating medium without reflection. This is in contrast to the reflection type system in which either the surface of the light modulating medium is reflecting or in which there is a reflecting mirror beneath the modulating medium. In FIG. 3 there is illustrated a transmission type embodiment of my invention. Although, this embodiment could have been illustrated in relation to a nonpermanent type of modulating medium such as is disclosed in FIGS. 1 and 2, in which case the modulating medium 2 would be held in a transparent vessel, the modulating medium in FIG. 3 is a thermoplastic tape 24 in which the diffraction gratings have previously been formed by an electron writing system that may, for example be the one described and claimed in my copending application S.N. 698,167, now abandoned, which is assigned to the assignee of the present invention. The electron writing system and thermoplastic tape described and claimed in the aforementioned abandoned application Serial No. 698,167 is now presented along with additional subject matter in copending application Serial No. 8,842, filed February 15, 1960, as a continuation-in-part of said application Serial No. 698,167 and in application Serial No. 89,424, filed January 23, 1961, as a division of said application Serial No. 8,842. Such thermoplastic tape may comprise a base material with a thermoplastic coating. The base material is optically clear and smooth and may suitably comprise 4 mil thick optical grade polyethylene terephthalate sold under the name Cronar. The thermoplastic layer on the film is also optically clear, having a substantially infinite room temperature viscosity and a relatively fluid viscosity at a temperature of 100–150° C. One such satisfactory thermoplastic material is a blend of polystyrene, m-terephenyl and a copolymer of 95 weight percent of butadiene and 5 weight percent styrene. Specifically, the composition may be 70 percent polystyrene, 28 percent m-terephenyl and 2 percent of the copolymer. The film thickness can vary from about 0.01 mil to several mils, with the preferred thickness being about equal to the distance between depressions in the film. The diffraction gratings in this thermoplastic tape 24 function exactly as the diffraction gratings in the modulating medium 2 in FIGS. 1 and 2. Conversely, a thermoplastic tape could readily be utilized in the embodiments of FIGS. 1 and 2 instead of the oil-type modulating medium there illustrated. Of course, the tape 24 must be moved to present different diffraction gratings to the optical system while in the oil-type modulating medium different diffraction gratings are being continuously formed by the electron beam while the prior ones decrease to zero amplitude. The means for moving tape 24 is illustrated schematically as a motor 25 that continuously moves tape 24.

As previously mentioned, in these optical systems a plurality of light sources are often desired. In FIGS. 1 and 2 these plurality of light sources are obtained by reflecting light from a plurality of members 6. Thus, the light reflected from each member 6 appears to originate from a different source of light. However, in the FIG. 3 embodiment there is no such reflection. Instead the plurality of light sources is obtained by use of a first masking system comprising a plurality of opaque areas or bars 27 between which there are transparent areas or slits 28. With this arrangement, the light transmitted by each transparent area 28 appears to originate from a different source of light and the desired plurality of light sources are obtained.

This first masking system is positioned on the focal surface of a lens 30, which thus images the light from this masking system at infinity. This light then passes through modulating medium 24.

A second masking system is provided which is somewhat similar to that previously described in reference to the discussion of FIGS. 1 and 2, but which does not have curved bars. As regards the bars, it is similar to the first masking system in FIG. 3. This second masking system has opaque areas or bars 32 between which there are transparent areas or slits 33. The transparent areas 28 and 33 in the first and second masking systems need not be slits, but could be circles or have some other configuration. It is only necessary that when there are no diffraction gratings in medium 24, that the light transmitted by transparent areas 28 is imaged upon opaque areas 32 of the second masking system, and that when there are diffraction gratings, the desired diffracted light is transmitted by areas 33.

In FIG. 3 the second masking system is positioned on or very close to the focal surface of lens 9 so that in the absence of diffraction gratings in modulating medium 24 the light transmitted by areas 28 is imaged by lens 9 upon the opaque areas 32 of the second masking system. These nondiffracted light rays, when incident upon lens 9, have directions such as to image at infinity. Thus, lens 9 focuses these rays on its focal surface. As in the FIG. 1 embodiment, the second masking system is mounted to lens 9 so as to always be in the focal surface thereof. And the whole assembly of lens 9 and the second masking system are movable with respect to tape 24 so that lens 9 can be positioned to focus the diffracted light on screen 15.

As previously explained, if there are diffraction gratings in the modulating medium 24, they diffract some of the light through transparent areas 33 in the second masking system as a function of the parameters of these diffraction gratings. In the case of phase diffraction gratings, the intensity of the light transmitted depends upon the amplitude of the diffraction gratings and the particular colors transmitted depends upon the grating spacings. The transmitted light is focused by lens 9 on projection screen 15 where the light forms an image corresponding to the diffraction gratings in modulating medium 24. Lens 9 is movable with respect to tape 24 so that it can focus the light on the projection screen 15 in accordance with the equation $$\frac{1}{f} = \frac{1}{p} + \frac{1}{q}$$

where the distance between lens 9 and modulating medium 24 is the object distance $p$ and the distance between lens 9 and screen 15 is the image distance $q$. This movement of lens 9 does not affect the focusing of the light on the second masking system since the second masking system is always in the focal surface of lens 9. Thus, lens 9 performs the dual function of focusing light on the second masking system and focusing light on the projection screen 15.

The FIG. 3 embodiment provides large magnification. This result follows from the placement of lens 9 very close to modulating medium 24. The closer lens 9 is to modulating medium 24 the greater the magnification of the image on screen 15. In the prior type transmission type optical systems the projection lens could not be placed between the light modulating medium and the second masking system because it would interfere with the focusing of the light on the second masking system. Thus, the present optical system is capable of much more magnification.

To summarize, in the embodiments of my invention a single lens performs the dual functions of focusing light on a masking system while also focusing light on a projection screen. This masking system and lens are fixedly mounted with respect to one another such that the masking system is in the focal surface of the lens. Then this whole unit is moved with respect to the modulating medium to obtain the desired focusing of the image on the projection screen. It has been shown that in some applications that this invention results in a simpler optical system and in all applications it permits a greater magnification. These embodiments are applicable for the projection of either monochrome or color images. Also the type of diffraction gratings or light modulating medium that is utilized is not pertinent to the present invention. Furthermore, the information in the form of the diffraction grating need not be picture intelligence but could be another form of intelligence.

While the invention has been described with respect to certain sepcific embodiments, it will be appreciated that many modifications and changes may be made by those skilled in the art without departing from the spirit of my invention. I intend, therefore, by the appended claims, to cover all such modifications and changes as fall within the true spirit and scope of my invention.

What I claim as new and desire to secure by Letters Patent of the United States is:

1. An optical system for transmitting light as a function of the parameters of a diffraction grating in a reflective light modulating medium, comprising a source of light, a masking system comprising a reflecting region for reflecting light from said source on said light modulating medium and a transparent region for transmitting certain light diffracted by said diffraction grating, and a single lens system fixedly mounted to said masking system at the focal length of said lens system away from said masking system and being greater than the focal length away from said light modulating medium between said masking system and said light modulating medium for directing non-diffracted light away from said transparent region and for portraying an image corresponding to said diffraction grating beyond said masking system, said modulating system having an orientation substantially perpendicular to the light path between said lens system and said modulating medium.

2. An optical system for transmitting light as a function of the parameters of a diffraction grating in a light modulating medium, comprising a light modulating medium with a diffraction grating formed therein, a source of light, mirror means associated with said light modulating medium for reflecting light incident therein, a lens system, a masking system comprising a reflecting region for reflecting light from said source onto said light modulating medium and a transparent region for transmitting certain diffracted light as a function of the parameters of said diffraction grating, means for fixedly mounting said masking system to said lens system such that said masking system is substantially on a focal surface of said lens system and such that said lens system is between said masking system and said light modulating medium at greater than its focal length from said light modulating medium, and means for providing relative movement between said lens system and said light modulating medium but which maintains said lens system at distances greater than its focal length away from said light modulating medium, said lens system forming a real image corresponding to said diffraction grating beyond said masking system, and said mirror means having a surface at least partially perpendicular to the light path between said mirror means and said lens system.

3. An optical system comprising a light modulating medium with a diffraction grating formed therein, a light source, a masking system comprising a plurality of reflecting members for reflecting light from said light source onto said light modulating medium, said reflecting members being spaced by transparent areas, a single lens system between said medium and said masking system at distances greater than its focal length away from said light modulating medium, means for fixedly mounting said masking system to said lens system such that said masking system is substantially on a focal surface of said lens system, mean associated with said modulating medium for reflecting onto said masking system light diffracted by said diffraction grating, whereby light is transmitted by the transparent areas in said masking system as a function of the parameters of said diffraction grating, and means for moving said masking system and said lens system with respect to said light modulating medium.

4. In an optical system, the combination of a masking system comprising a plurality of transparent areas separated by opaque areas, a lens system fixedly mounted to said masking system such that said masking system is substantially on a focal surface of said lens system, a source of generally parallel light rays directed through said lens system upon said masking means, a diffraction grating through which said light rays pass in reaching said lens, and means for moving said lens system and said masking system as a unit relative to said diffraction grating.

5. In an optical system for transmitting light as a function of the parameters of a diffraction grating in a light modulating medium, comprising: in the same light path, a light modulating medium, a lens system, and a masking system having an opaque region and a transparent region; means for fixedly mounting said masking system substantially on a focal surface of said lens system and such that said lens system is between said masking system and said light modulating medium; and means for providing relative movement between said lens system and said light modulating medium at distances greater than the focal length of said lens system, said lens system forming a real image corresponding to said diffraction grating beyond said masking system.

6. In an optical system for transmitting light as a function of the parameters of a diffraction grating in a light modulating medium, comprising: in the same light path, a light modulating medium including a diffraction grating, a lens system, and a masking system having an opaque region and a transparent region; and means fixedly mounting said masking system substantially on a focal surface of said lens system and such that said lens system is between said masking system and said light modulating medium at a distance greater than the focal length of said lens system from the light modulating medium, said lens system forming a real image corresponding to said diffraction grating beyond said masking system.

7. An optical system comprising: in the same light path, a light modulating medium with a diffraction grating formed therein, a restricted light source projecting generally parallel light on said light modulating medium to be diffracted by said diffraction grating, a masking system on the opposite sides of said medium from said light source comprising an opaque region for masking certain light diffracted by said diffraction grating and having a transparent region for transmitting certain light as a function of the parameters of said diffraction grating, and a lens system; means for fixedly mounting said lens system to said masking system such that said lens system is between said light modulating medium and said masking system and such that said masking system is substantially on a focal surface of said lens system; and means for moving said lens system and said masking system with respect to said light modulating medium at distances greater than the focal length of said lens system in order for said lens system to form a real image corresponding to said diffraction grating beyond said masking system.

8. In an optical system for transmitting light as a function of the parameters of a diffraction grating in a transparent light modulating medium, comprising: in the same light path, a transparent light modulating medium with a diffraction grating formed therein, a source of light for projecting light on said light modulating medium, a first lens system positioned between said source of light and said light modulating medium, said lens system being positioned such that said source of light is on a focal surface of said lens system, a masking system on the opposite side of said medium from said light source having an opaque region for masking certain light transmitted through said light modulating medium and having a transparent region for transmitting certain light diffracted by said diffraction grating, and a second lens system positioned between said masking system and said light modulating medium; and means for fixedly mounting said masking system to said second lens system such that said masking system is substantially on a focal surface of said second lens system and wherein said second lens system is located at greater than its focal length away from said modulating medium, said second lens system acting to form a real image in accordance with said diffraction grating beyond said masking system as well as to direct non-diffracted light away from said transparent region.

9. The optical system as defined in claim 8 and means for providing relative movement between said second lens system and said light modulating medium.

10. The optical system as defined in claim 8 wherein said light source comprises a plurality of transparent areas separated by opaque areas, and means for shining light through said transparent areas.

11. The optical system as defined in claim 10 wherein said masking system comprises a plurality of transparent areas separated by opaque areas.

12. A microscope optical system comprising a microscope having an objective lens and an eyepiece, and in the same light path a masking system positioned between said objective lens and said eyepiece substantially on the focal surface of said objective lens, said masking system comprising a plurality of reflecting areas separated by transparent areas, and means for impinging light on said reflecting areas.

13. A microscope optical system for providing an image as a function of a diffraction grating in a light modulating medium, comprising a microscope with an objective lens and an eyepiece, an aperture in said microscope, a light source for projecting light through said aperture, and in the same light path a masking system positioned between said objective lens and said eyepiece substantially on the focal surface of said objective lens, said masking system comprising a plurality of spaced reflecting members positioned to reflect light from said source through said objective lens onto said light modulating medium, and means associated with said light modulating medium for reflecting through said objective lens light incident on said light modulating medium.

14. A microscope optical system for providing an image as a function of the parameters of a diffraction grating in a light modulating medium, comprising: in the same path, a light modulating medium with a diffraction grating impressed therein, a microscope with an objective lens and an eyepiece, and a masking system positioned between said objective lens and said eyepiece substantially on the focal surface of said objective lens; said masking system comprising a reflecting region and a transparent region; means for impinging light on said reflecting region; said reflecting region being positioned to reflect this incident light through said objective lens onto said light modulating medium; and means associated with said light modulating medium for reflecting light through said objective lens that is incident on said light modulating medium.

15. An optical system for producing a real image on an image receiving surface as a function of the parameters of a diffraction grating in a light modulating medium, comprising, in the same light path, a light source for projecting light on said light modulating medium to be diffracted by said diffraction grating, a masking system located between said light modulating medium and said image receiving surface, said masking system comprising an opaque region for masking certain light not diffracted by said diffraction grating and having a transparent region for transmitting certain light as a function of the parameters of said diffraction grating, and a lens system located between said light modulating medium and said masking system at its focal length away from said masking system and at an image distance away from said image receiving surface wherein the object distance is the distance from said lens system to said light modulating medium, whereby said lens system acts singly to portray an image corresponding to said diffraction grating upon said image receiving surface as well as to direct non-diffracted light away from said transparent region in said masking system.

16. An optical system for producing a real image on an image receiving surface as a function of the parameters of a diffraction grating in a transparent light modulating medium, comprising, in the same light path, a light source for projecting light on said light modulating medium, means positioned between said light source and said light modulating medium adapted in cooperation with said source to deliver substantially parallel light beams to said light modulating medium, a masking system located between said light modulating medium and said image receiving surface, said masking system having an opaque region for masking parallel light beams from said source transmitted through said light modulating medium and having a transparent region for transmitting light diffracted by said diffraction grating, and a lens system positioned between said masking system and said light modulating medium and at an image distance away from said image receiving surface wherein the object distance is the distance from said lens system to said light modulating medium, said second lens system acting to portray an image corresponding to said diffraction grating upon said image receiving surface as well as to direct non-diffracted light away from said transparent region in said masking system.

References Cited in the file of this patent

UNITED STATES PATENTS

| | | |
|---|---|---|
| 1,590,532 | Lenouvel | June 29, 1926 |
| 2,206,169 | Eisenhut | July 2, 1940 |
| 2,562,181 | Frommer | July 31, 1951 |
| 2,605,352 | Fischer | July 29, 1952 |
| 2,813,146 | Glenn | Nov. 12, 1957 |